United States Patent [19]

Fuglsang

[11] Patent Number: 5,758,602

[45] Date of Patent: Jun. 2, 1998

[54] DRIFT WEED TRAPPING AND ALGAE GROWING ABALONE CAGE AND CONSTRUCTION TECHNIQUE

[76] Inventor: Soren Ankeroy Fuglsang, P. O. Box Cape Barren Island, Tasmania 7257, Australia

[21] Appl. No.: 727,538

[22] PCT Filed: Apr. 10, 1995

[86] PCT No.: PCT/AU95/00200

§ 371 Date: Oct. 28, 1996

§ 102(e) Date: Oct. 28, 1996

[87] PCT Pub. No.: WO95/28079

PCT Pub. Date: Oct. 26, 1995

[30] Foreign Application Priority Data

Apr. 14, 1994 [AU] Australia .................. PM5018

[51] Int. Cl.⁶ .................................................. A01K 61/00
[52] U.S. Cl. .................................. 119/223; 119/237
[58] Field of Search .......................... 119/223, 237, 119/236, 238, 239, 240, 241, 242, 216

[56] References Cited

U.S. PATENT DOCUMENTS

| | | | |
|---|---|---|---|
| 3,650,244 | 3/1972 | Fordham | 119/237 |
| 3,702,599 | 11/1972 | Herolzer | 119/241 |
| 3,824,957 | 7/1974 | Halaunbrenner | 119/237 |
| 3,999,895 | 12/1976 | Wiegardt, Jr. | 119/241 |
| 4,182,270 | 1/1980 | Fourcher | 119/237 |
| 4,186,687 | 2/1980 | Gilpatric | 119/241 |
| 4,231,322 | 11/1980 | Gilpatric | 119/237 |
| 4,253,418 | 3/1981 | Lockwood et al. | 119/236 |
| 4,744,331 | 5/1988 | Whiffin | 119/223 |
| 5,172,649 | 12/1992 | Bourgeois | 119/223 |
| 5,359,962 | 11/1994 | Loverich | 119/223 |
| 5,438,958 | 8/1995 | Ericsson et al. | 119/223 |
| 5,515,913 | 5/1996 | Wilkerson | 119/223 |
| 5,628,280 | 5/1997 | Ericsson | 119/239 |

FOREIGN PATENT DOCUMENTS 5260879 10/1993 Japan.
1370015 10/1974 United Kingdom.

*Primary Examiner*—Michael J. Carone
*Assistant Examiner*—Yvonne R. Abbott
*Attorney, Agent, or Firm*—Edwin D. Schindler

[57] ABSTRACT

A cage for growing abalone, or other suitable underwater species, includes a ballast device having a device for holding the cage steady in flowing water. The cage is constructed substantially from a stiff mesh material, with at least two opposite faces of the cage being constructed so that folds of mesh form collection chambers. The collection chambers are substantially U-shaped and sealed at their innermost ends while having a V-shaped funnel entrance, so that an escape of an underwater species held within the cage is prevented. A large surface area of mesh is presented to water flowing through the cage. As a result, drift weed or other food material is able to be captured on the large surface area of mesh for providing a food source for the underwater species within the cage. The construction of the cage allows for the collection of drift weed, regardless of the direction that the tide is flowing.

12 Claims, 4 Drawing Sheets

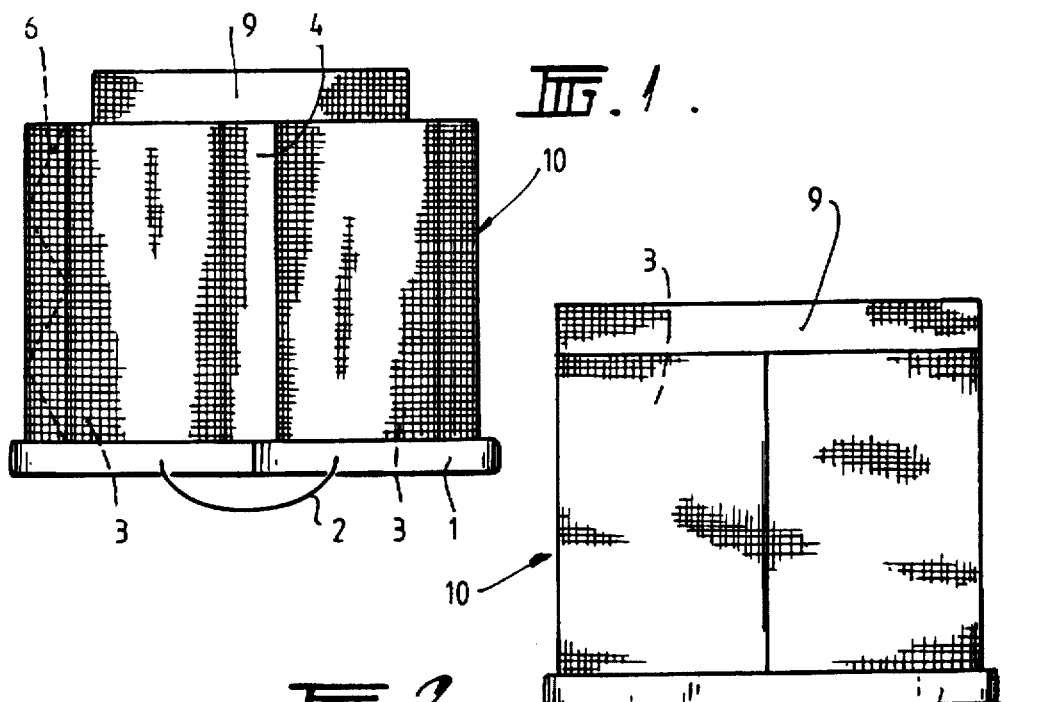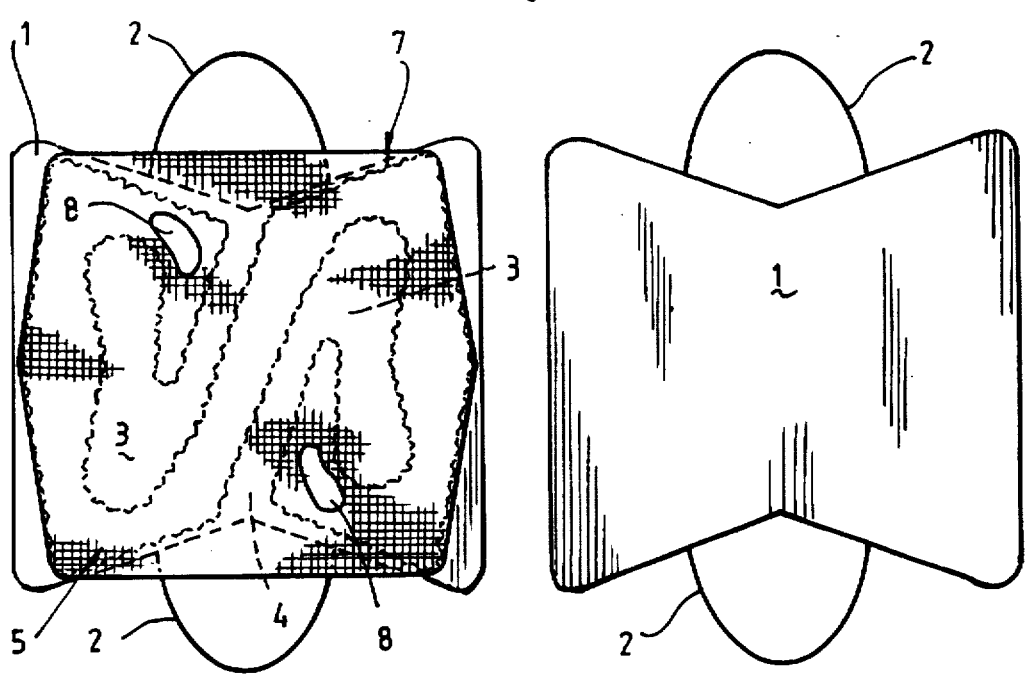

5,758,602

DRIFT WEED TRAPPING AND ALGAE GROWING ABALONE CAGE AND CONSTRUCTION TECHNIQUE

This invention provides for a cage for growing abalone, or other suitable under water species, which includes a means for trapping drift weed to provide a ready and accessible source of food for the abalone or other species held within the cage, and includes the method for its construction.

In one form of farming under water animals, particularly marine fish or shell fish, the animals are maintained in cages or other means, which are secured to the bottom of the sea bed. The animals feed as they would in the wild by catching food that drifts by as a result of tidal movement and currents. From the farming perspective, this is relatively inefficient because the amount of food passing by, without supplementary feeding, is variable, as the tides and currents are variable, and hence much of it passes straight through the cage without being caught by the animals. This means that the numbers of animals that can be maintained in a cage, and their rates of growth are significantly less than optimal for the actual amount of food passing through the cage.

The object of the present invention is to provide a cage which essentially catches the food for the animals and concentrates it in such a way that they have ready access, at will, to as much food as possible at all times. As a result more animals can be maintained in a given cage and growth rates are improved.

Attempts to do this in the past have had limited success because food that is brought in with one tide is easily washed out again when the tide reverses. It is a further object of the invention to prevent loss of captured food when tides or currents change direction, and further, to maximize the efficiency of the food collection by the invention by collecting food from the water moving in both forward and reverse directions.

It is still a further object of the invention to present the collected and concentrated food to the captive animals is the most accessible and efficient way possible.

An additional advantage of the present invention is that algae will grow on the mesh and captured drift weed or other food material and the algae form a further source of nutrition.

The present invention provides for a cage for holding abalone or other suitable under water species, constructed mainly from stiff mesh of plastic or metal or other suitable material, with a ballast means capable of holding the cage steady in flowing water, constructed so that a large surface area of mesh is presented to the flow of water through the cage to provide sieving of drift weed or similar plant or other material from the flowing water and to allow capture and concentration of the drift weed or other material by the cage so that the animals within the cage can feed on the drift weed or plant material.

The ballast means can be in the form of a concrete base to the cage or can be attached to it by lines.

In order to present the maximum possible surface area to the flowing water, the cage may be of a variety of different shapes including butterfly wing, multi-lobe, star or oblong.

In a preferred embodiment of the invention the walls of the cage are formed into collection chambers for collecting drift weed or other food suitable for the animals in the cage to feed upon.

In one form the openings to the chambers can be formed in a V-shape to maximize funnelling of material into it.

The chambers can be more or less U-shaped with the funnel opening to the outside at one end and closed at the other, so that food captured from water flowing into the chamber is not all lost by being washed out when the flow of water is reversed such as when the tides change.

The cage may have attached to the top of it an upper chamber of similar mesh, access to which is available through suitable holes in the top of the cage. The abalone or other species in the cage can move into the upper chamber which provides an additional surface area of mesh from the walls of the chamber through which the abalone or other species can graze or feed on the drift weed or other material captured in the chambers.

The concrete base may have rope handles attached to it to allow easy handling and connection to lines for submerging and retrieving. They can also assist in aligning the cage with the current or tidal flows.

The space between the side walls and the collection chambers can have pleated lengths of coreflute or plastic panel within them. There could be a number in each cage. The abalone or other species attach to these which act as a means of holding the abalone or other species and therefore assists in their easy handling for removal and transfer. Also the panels act as points of attachment and growth for useful amounts of diatoms and algae, which are also a source of food.

When the abalone or other species are large enough greater access to food can be achieved by using a cage which has chambers with a window covered with coarse mesh at the end of the chamber opposite the entrance. The coarse mesh should be fine enough to prevent escape of the abalone or other species but course enough to allow drift weed to pass through into the parts of the chamber holding the abalone or other species. The finer mesh of the outer walls of the cage will prevent the drift weed from passing straight through.

For some applications for very large abalone or other species the entire wall of the chamber can be of the coarser mesh. Again the fine mesh of the outer cage walls act as the filter for the drift weed.

To assist in preventing loss of collected food from the chambers when the tide reverses and back flushes, at least one and normally two retaining baffles, contructed of plastic mesh or similar material, can be fitted in the throat of the collection chambers, close to the opening. The baffles are angled at 45 degrees to the water flow.

The invention also includes the method of constructing the cage.

To assist with understanding the invention, reference will now be made to the accompanying drawings which show preferred embodiments of the invention.

In the drawings:

FIG. 1 shows a side elevation of the cage, from the side facing the tide flow, with a top chamber in place;

FIG. 2 shows a side elevation of the cage in FIG. 1, from the a side at right angles to the tide flow;

FIG. 3 shows the view from the top of the cage, without the top chamber in place, and shows the two collection chambers and the holes in the top mesh which allow abalone access to the top chamber;

FIG. 4 shows the concrete base and securing ropes;

Figure 5:
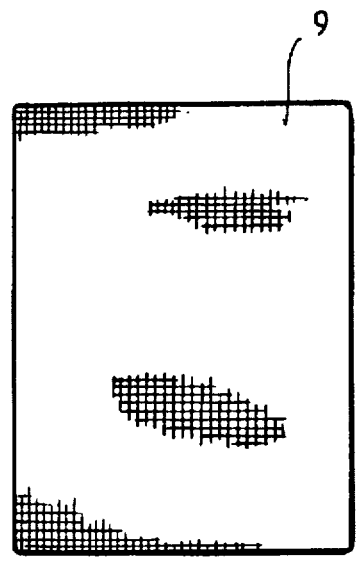
FIG. 5 shows the completed top chamber.

Referring to FIGS. 1 to 4, the cage consists of a concrete base 1 which is more or less square with two opposite V-shaped sides and the other two straight sides. Ropes 2 are attached to the base for lifting and securing to lead cored long line.

Vertical walls 10 of suitable mesh are set around the outside edge of the base. At the points of the two V-shapes the mesh walls are formed into the more or less U-shaped collection chambers 3 which extend into the interior of the cage. The collection chambers are closed at the inner most end but open to the outside via the V-shaped funnel like entrance 4. The region of the interior of the cage 5 between the collection chambers 3 is where the abalone or other species reside. A pleated plastic panel 6 is use as an attachment for the abalone or other species for easy handling. The cages can be fitted with a number of conflute or pleated panels.

The top of the cage is a sheet of mesh 7 which is sewn into place, normally with 3 mm cord, and which can be readily removed by undoing the cord, for access to the interior of the cage. The top mesh is square or rectangular and overhangs the two V-shaped indented sides. The top mesh has holes 8 above the residence part of the cage 5 to allow the abalone or other species to move into the upper chamber 9. The holes must be covered in versions of the cage without an upper chamber. The upper chamber 9 is sewn into place onto the sheet of mesh forming the top of the cage.

Figure 6:
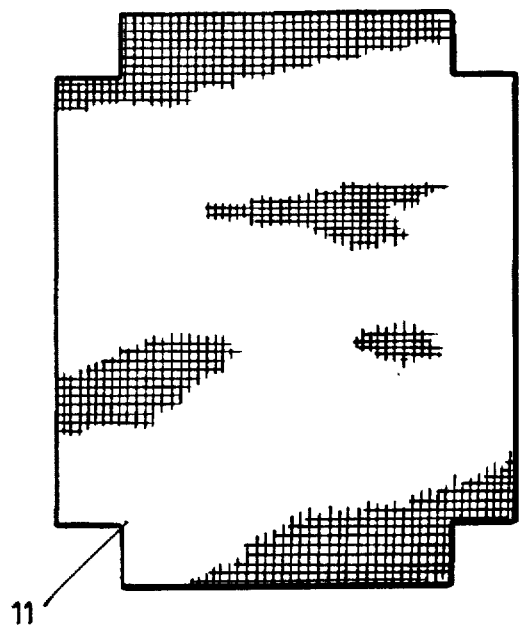
FIG. 6 shows the prefabricated top chamber before the edges are sewn together to make the complete chamber shape.
Figure 7:
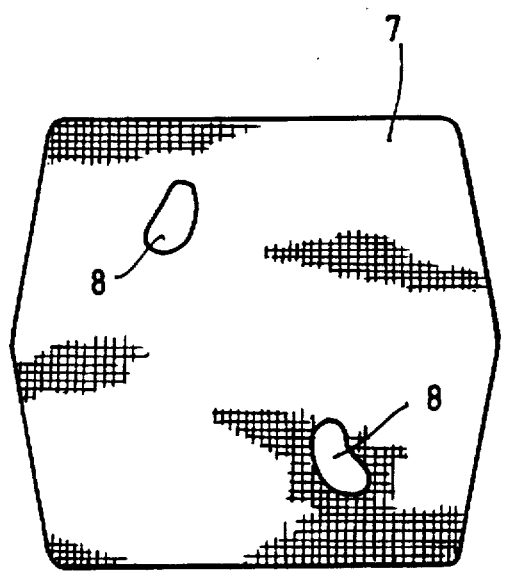
FIG. 7 shows the normal cage top to which the top chamber is sewn and shows the top chamber access holes.

Referring to FIGS. 5 to 7, the upper chamber 9 of the cage is constructed from a single piece of mesh 11 with the corners removed. The sides of the chamber are formed by folding up the edges and sewing the corners. Finally the chamber is sewn onto the top mesh 7 of the cage taking care to cover the holes 8.

In one particular form of the invention there is no concrete base but instead a bottom mesh and chamber similar to the top mesh 7 and upper chamber 9 are provided for. This cage floats clear of the sea bed, held by lines attached to tubes fixed to the sides, the lines being held to the sea bed by suitable ballast means. The invention includes versions of this particular floating form which have either top or bottom chambers, or neither.

In another particular form of the invention the concrete base has a hatch which can be opened when abalone are large enough, to allow restocking of depleted natural habitats.

In yet another particular form of the invention a false bottom is attached to the cage separated by spacers which leave a cavity that presents a safe haven for the abalone when large enough, to allow restocking of depleted natural habitats.

Figure 8:
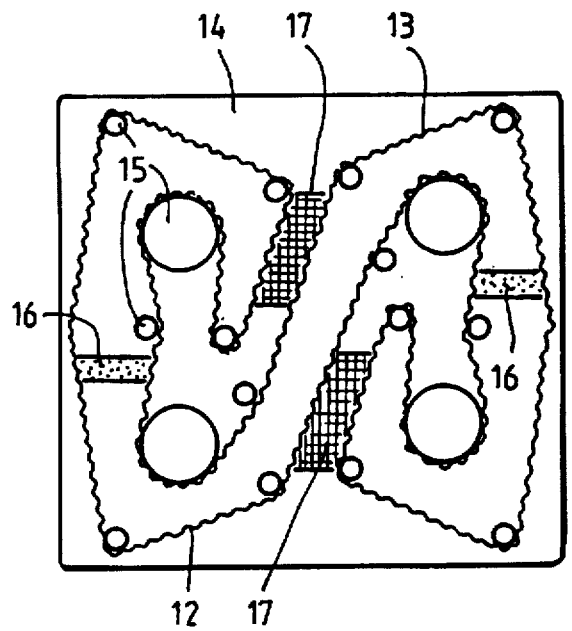
FIG. 8 shows a top view of the cage during construction and shows the plastic spreaders used during construction to stretch the cage mesh walls when sewing the top into position, and also shows the retaining baffle position.
Figure 9:
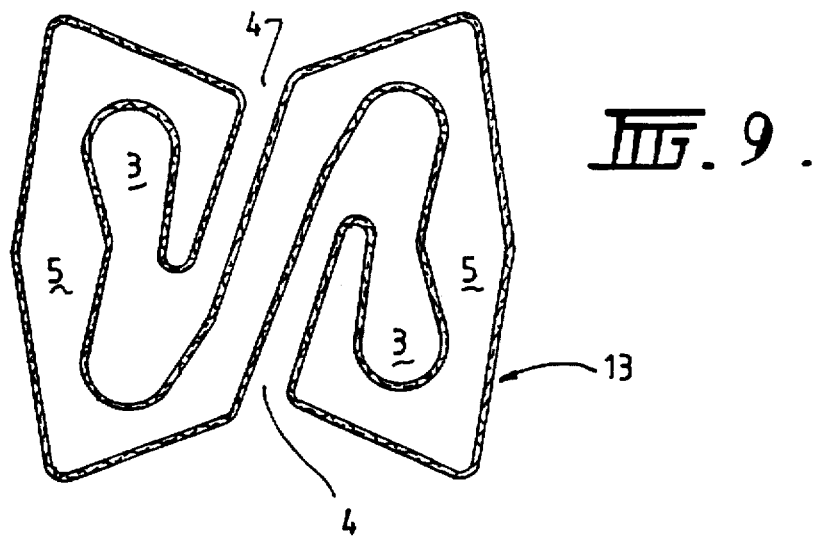
FIG. 9 shows a top view and shows the shape of side walls and collection chambers.
Figure 10:
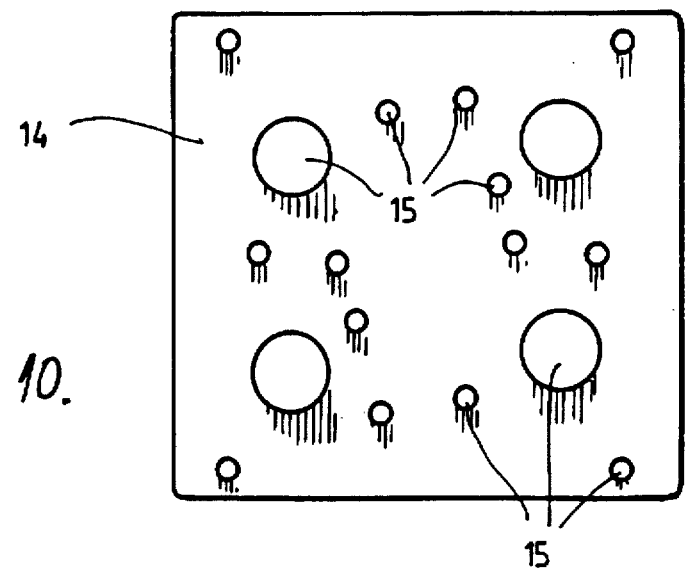
FIG. 10 shows the template used to shape side walls and collection chambers.

Referring to FIGS. 8 to 10, the cage is constructed by sewing the ends of a suitable length of mesh of plastic or metal or other suitable material to form a loop 12. The loop is then fashioned into the correct shape 13 to form the cage walls and chambers with the use of the template shown in FIG. 10.

The template consists of a base 14, normally of 4 mm steel, onto which eighteen metal uprights 15 are welded. The diameters and positions are selected to give the shape 13 required. The top mesh, with or without the top chamber attached, is then sewn onto the formed structure. Plastic spreaders 16 can be used temporarily to stretch the mesh before sewing.

At this stage mesh baffles, designed to prevent back flushing, can be sewn into place in the throat 17 of the chambers. Once the top mesh is in place the structure is removed from the template. Concrete is poured into a mould to about 50 mm depth and the bottom of the structure, and any attachment ropes, allowed to set in the concrete. When the concrete is set the structure is complete.

Figure 11:
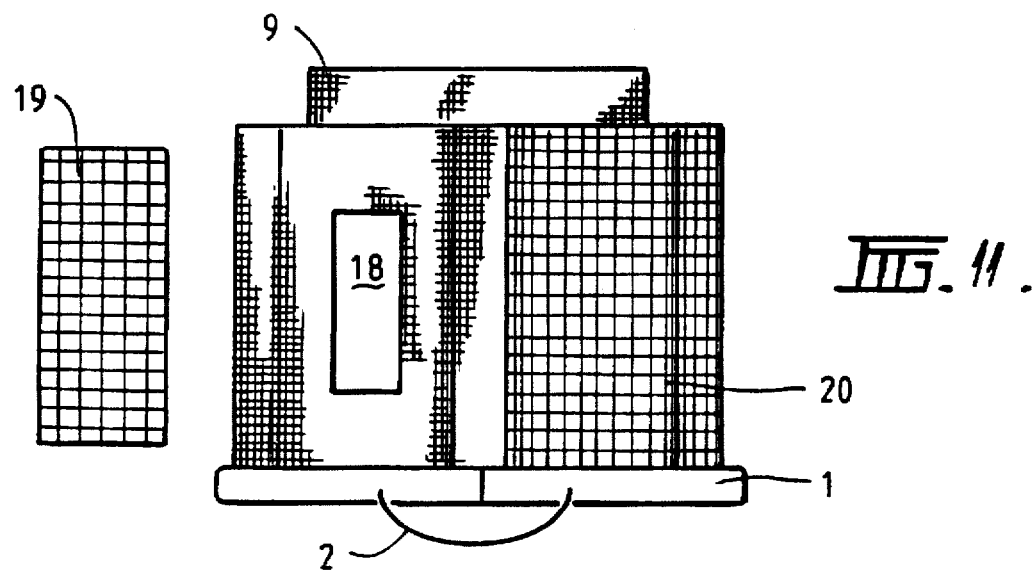
FIG. 11 shows a side elevation of a modified cage for use with large abalone and shows the use of courser mesh and the window in the chamber wall.

Referring to FIG. 11, as the abalone grow larger they can be transferred to cages with parts of their walls of courser mesh which allows more and bigger drift weed and other food actually to pass from the chamber, or directly, into the the residence part of the cage. The finer mesh walls retain it there. The cage in FIG. 11 shows two such means with a window 18 cut in the back of the collection chamber. It is covered by a mesh 19 before use. Secondly, part of the V-shaped wall is constructed of the courser mesh 20. This allows the drift weed and other food to pass diectly into the cage rather than the chamber. The material is prevented from passing right through because of the finer mesh of the other walls.

Figure 12:
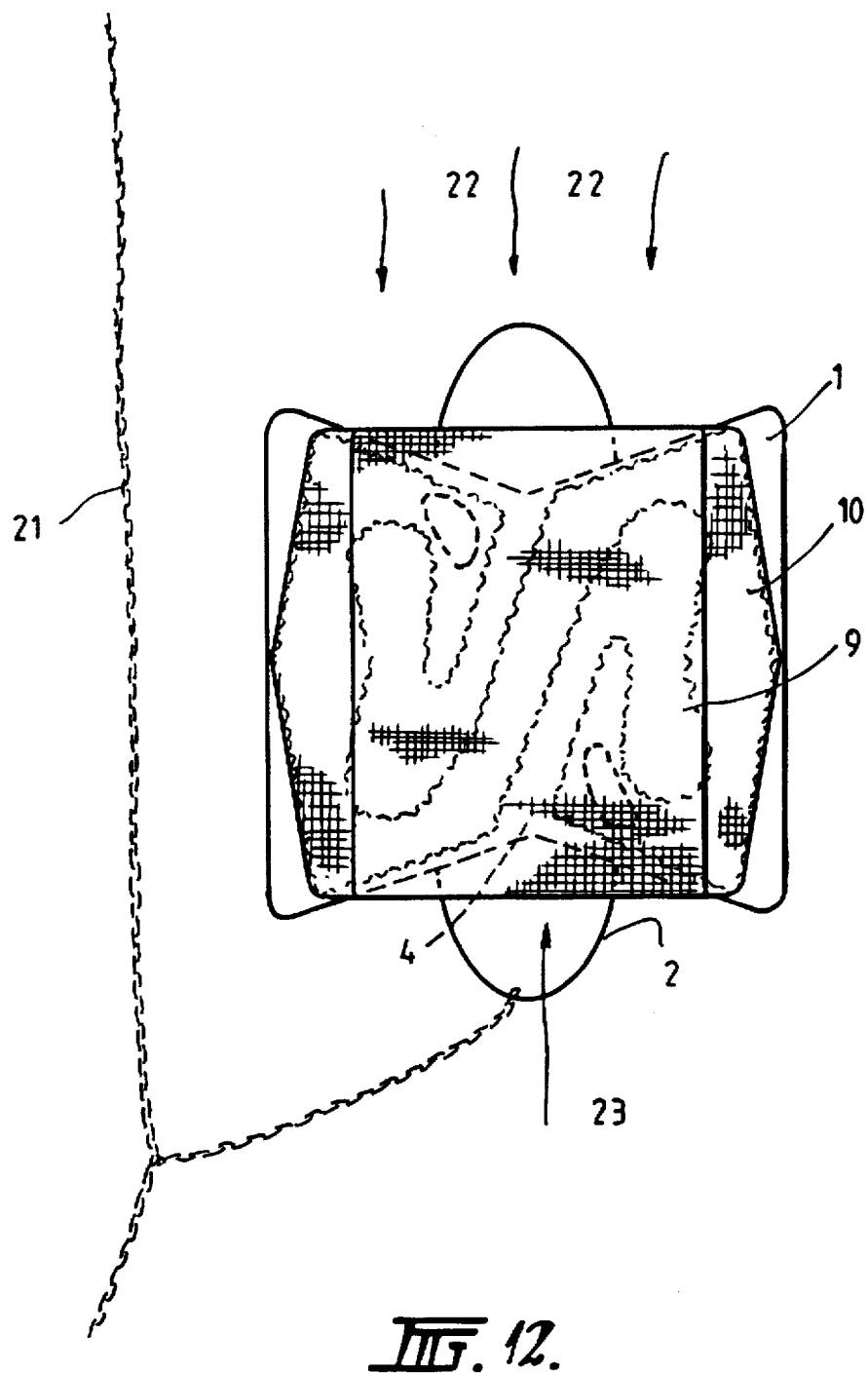
FIG. 12 shows the cage in position on the sea bed, tied on lead cored rope on longline of same material, and shows the tide and drift weed flow.

Referring to FIG. 12, cages can be attached via their rope handles to the long line 21 and hence deployed in the correct orientation on the sea bed. The proper orientation allows drift weed and other food to be collected into one chamber when the tide is flowing 22 and into the other chamber when the tide is ebbing 23. When properly orientated, with properly constructed chambers and with baffles in place, the drift weed and other food collected into a chamber when the water is flowing in one direction should not be flushed out when the flow direction is reversed.

The claims defining the invention are as follows:

1. A cage for holding abalone or other such underwater species, comprising:

a ballast device including means for holding said cage steady in flowing water, said cage being constructed substantially from a stiff mesh material, with at least two opposite faces of said cage being constructed so that folds of mesh form collection chambers, said collection chambers being substantially U-shaped and sealed at their innermost ends while having a V-shaped funnel entrance, so that an escape of underwater species held within said cage is prevented and that a large surface area of mesh is presented to water flowing through said cage, whereby drift weed or other food material is able to be captured on the large surface area of mesh for providing a food source for the underwater species within said cage.

2. A cage as claimed in claim 1 in which the ballast is provided by a solid base of concrete capable of holding the cage steady on the sea bed.

3. A cage as claimed in claim 2, further comprising rope handles attached to the concrete base for attaching to long lines and for easy handling and aligning.

4. A cage as claimed in claim 1, wherein said stiff mesh material is made of plastic.

5. A cage as claimed in claim 1, wherein said stiff mesh material is made of metal.

6. A cage as claimed in claim 1, and having an upper food collection chamber which can be accessed by abalone or other underwater species and which provides them with access to additional drift weed and other material held in the upper food collection chamber.

7. A cage as claimed in claim 6, further comprising a bottom chamber constructed in a substantially similar manner to the upper food collection chamber, said bottom chamber being able to float clear of a sea bed, and having means for being secured to lines attached to said ballast device and other cages.

8. A cage as claimed in claim 1, in which abalone or other underwater species are grown attached to plastic sheets within the cage, for easy access and removal.

9. A cage as claimed in claim 1, with a window cut into the back wall of at least one collection chamber, which is covered with coarse mesh and through which drift weed and other material can pass directly into the cage.

10. A cage as claimed in claim 1, in which part of at least one of the walls forming the V-shaped entrance to the collection chamber, is constructed of a coarse mesh so as to allow drift weed and other material to pass through directly into the cage.

11. A cage as claimed in claim 1 with retaining baffles attached at the throat of the collection chamber, angled at 45 degrees to the water flow and designed to prevent back flushing of captured drift weed or other material.

12. A method for constructing a cage for holding abalone or other such underwater species, said cage including a ballast device including means for holding said cage steady in flowing water, said cage being constructed substantially from a stiff mesh material, with at least two opposite faces of said cage being constructed so that folds of mesh form collection chambers, said collection chambers being substantially U-shaped and sealed at their innermost ends while having a V-shaped funnel entrance, so that an escape of underwater species held within said cage is prevented and that a large surface area of mesh is presented to water flowing through said cage, whereby drift weed or other food material is able to be captured on the large surface area of mesh for providing a food source for the underwater species within said cage, said method for constructing said cage comprising the steps of:

constructing outer walls of said cage from a loop of mesh using a template containing uprights of appropriate dimensions and set at an appropriate location of a base for allowing an accurate fashioning of sides of said cage;

constructing a top for said cage by sewing a piece of mesh onto the sides of said cage; and, forming the base of said cage by placing a structure containing the sides and top of said cage, the sides and top being pre-formed, into a mold containing wet concrete and allowing the wet concrete to set.

* * * * *